Aug. 25, 1925. Re. 16,148

A. L. OTTO

METALLIC SCREEN

Original Filed Jan. 21, 1924 2 Sheets-Sheet 1

ON LINE 2-2, FIG. 1.

INVENTOR:
Arthur L. Otto.
BY
Wedderburn Franbanks.
ATTORNEYS.

Aug. 25, 1925. Re. 16,148

A. L. OTTO

METALLIC SCREEN

Original Filed Jan. 21, 1924 2 Sheets-Sheet 2

ON LINE 6-6. FIG. 5.

ON LINE 7-7. FIG. 5.

INVENTOR:
Arthur L. Otto.

BY
Wiedersheim & Fairbanks.
ATTORNEYS.

Reissued Aug. 25, 1925. Re. 16,148

UNITED STATES PATENT OFFICE.

ARTHUR L. OTTO, OF PHILADELPHIA, PENNSYLVANIA.

METALLIC SCREEN.

Original No. 1,496,594, dated June 3, 1924, Serial No. 687,513, filed January 21, 1924. Application for reissue filed May 5, 1925. Serial No. 28,222.

*To all whom it may concern:*

Be it known that I, ARTHUR L. OTTO, a citizen of the United States, residing at Philadelphia, county of Philadelphia, State of Pennsylvania, have invented new and useful Metallic Screens, of which the following is a specification.

My invention consists of certain novel construction in metallic screens for windows, doors and the like, whereby a more serviceable screen may be produced and at a lower cost than has been possible heretofore.

My invention further consists of a novel frame structure whereby extreme strength and rigidity is obtained; as well as novel means for replaceably securing metallic screening to the frame.

My invention relates particularly to the class of screens having channel shaped frame members, in contradistinction to the class of screens employing solid and bulky frame members which are less desirable for structural, economic, as well as other reasons.

It has been customary heretofore in making metallic screen frames, to shape the frame members out of strips of bendable sheet metal; bending the sheet metal back upon itself into various complex cross sectional shapes in an effort to obtain a rigid structure. Due to the very nature of the construction however, no screen frame of any considerable size could be produced sufficiently rigid without the use of some reinforcing means. This was particularly noticeable in the case of the mitered corner joints, which heretofore have been soldered along the thin contacting edges of the sheet metal, and in addition to the soldered joint, have been braced in some manner. This construction however, gave results not entirely satisfactory, and particularly so in screen frames of large proportions in which case the screen was subject to distortions.

Relevant to these prior screen structures I am aware of the Watson Patents Numbers 836,475, 956,239 and 1,030,694, each one of which sets forth some form of a screen frame member, built up of strips of sheet metal to form the desired shape, and including a tubular space within said shape. My invention however is clearly differentiated from this as well as other prior art, inasmuch, as my frame members are metallic, non-tubular, and substantially non-bendable; they are of simple, unitary form; and to no construction or device of the prior art do I herein make claim.

For the purpose of illustrating my invention, I have shown in the accompanying drawings, forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Referring to the drawings:—

Figure 1:
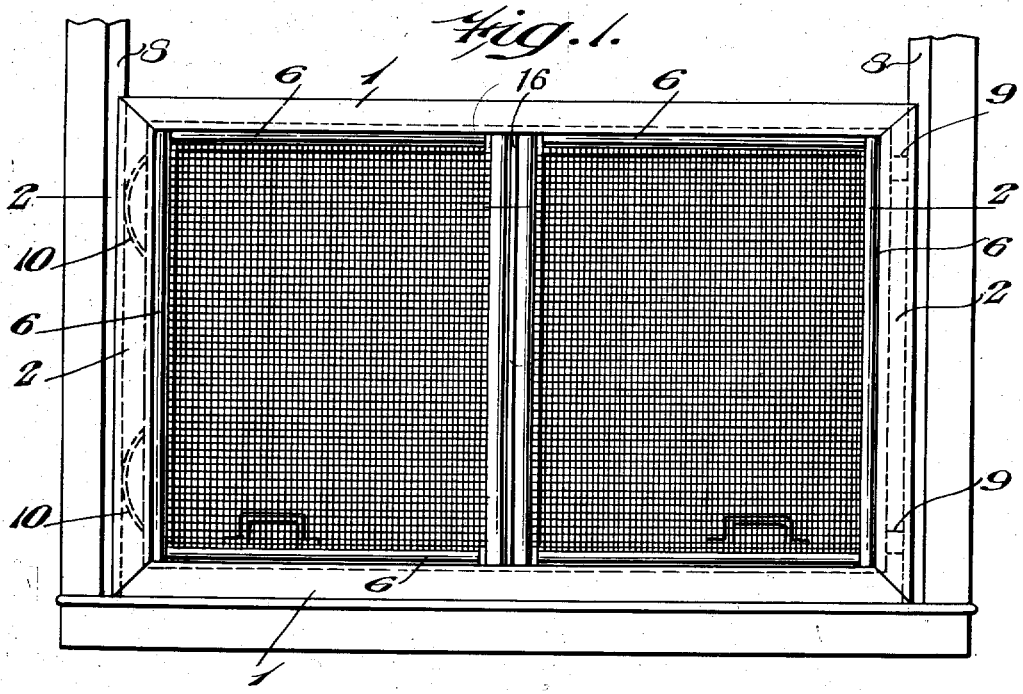
Figure 1 represents a view in elevation of a sliding screen embodying my invention.

My screen comprises a novel frame 1 of double channel shaped members, containing the guiding channels 2 on the outer edges of the frame and the screen retaining channels 3 on the inner sides or edges of the frame. The double channel frame members of my screen are of an integral piece of metal and substantially non-bendable, which adds greatly to the rigidity of the completed frame for any given width of frame members. Due to the solid character and relative thickness of the walls of my frame members, I am enabled to unite the same into an integral frame by any of the known processes of uniting metals, such as welding, brazing, fusing and the like; thus making any other corner reinforcing means, such as internal or external braces, clamps and the like, entirely superfluous; in so far as the intimate union of the frame member provides a joint as strong as any part of the frame members. While I may use any of the known structural metals or alloys in making my screen, I prefer to use a metal or alloy of several metals, which will not be subject to the corrosive action of the elements and at the same time lend an architectural value to the finished product by the natural color of the metal itself.

To the frame I secure the screen cloth 4 in a novel manner, so as to afford ready means of attaching, as well as removing the screen cloth for the purpose of rewiring; and at the same time provide positive locking means for said screen cloth. I accomplish this end by providing above the screen retaining channel 3, a continuous V shaped notch 5, into which I force one edge of a triangular anchor rod or tube 6 after having pressed the same into the screen retaining channel over the screen cloth.

In wiring a frame the screen cloth is cut to the proper size, and is then laid over the frame with its edges overlapping the screen retaining channels. The edges are then secured to the frame members in rotation; by first pressing or rolling the over lapping edge into the screen retaining channel, then inserting the anchor rod or tube over the screen cloth, and finally forcing the edge of the anchor into the locking notch; which operation not only secures the screen cloth to the frame, but draws it taut when the opposed side is already secured. In order to prevent the cutting of, or other injury to, the screen cloth, along the inner edge of the screen cloth retaining channel, I round the said inner edge of the screen cloth retaining channel, in a relatively large arc, as shown at 15 in Figs. 2, 3, 4, and 7.

Figure 2:
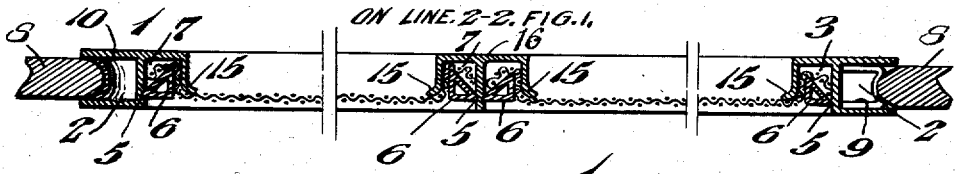
Figure 2, represents a section on line 2—2 of Figure 1.
Figure 3:
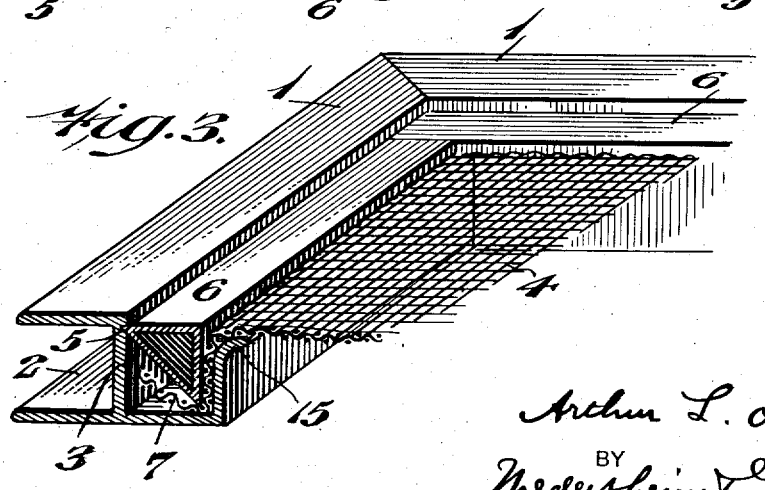
Figure 3, represents a perspective view of a fragment of the corner of a screen embodying my invention.
Figure 4:
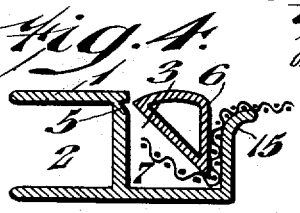
Figure 4, represents a sectional view of the frame member in the process of wiring.

My triangular anchor rod possesses a decided advantage, in so far as it provides a space 7 into which the loose edge of the screen cloth can be forced without tending to dislodge the anchor rod; which can be either of solid triangular cross-section, or in the shape of a triangular tube as illustrated in the drawings. In the first instance I avail myself of the elasticity of the walls of the screen retaining channel in forcing the edge of the anchor into the locking notch. The triangular tube designated by numeral 6 in Figs. 2, 3, and 4 is preferred by me however, since it provides simpler mode of operation; namely:—the tube, of which one side is originally convex, is hammered into position thereby straightening the convex side and forcing the locking edge of the triangle into the locking notch.

My frame structure is adapted to be made up into sliding, stationary, hinged or other screens. Fig. 1 represents a sliding screen embodying my invention, and adapted to slidingly engage the guide strips 8 by means of the outer channels 2 and the fixed bearings 9 and yielding bearings 10 on the two sides respectively. This yielding bearing provides ready means of inserting or removing the screen frame from between the guide strip as commonly practiced in the art.

A further advantage of the triangular shape of the anchor rod lies in the fact that the space 7 provided thereby, affords a ready means of securing the yielding spring bearings 10 to the inside of the channel 2; by simply inserting the free ends of the spring through slots, not shown in the drawings, provided in the inner wall of the channel 2, into the said space 7.

Figure 5:
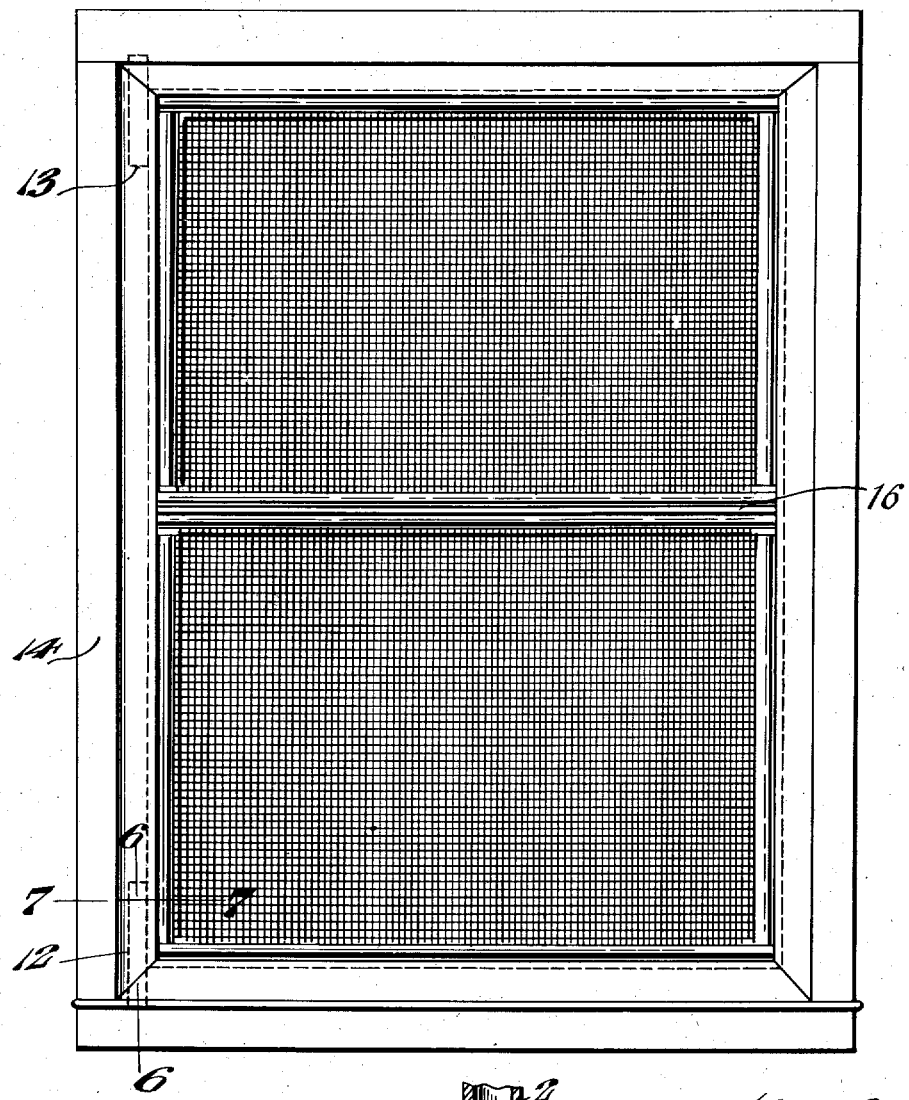
Figure 5, represents a view in elevation of a hinged screen embodying my invention.
Figure 6:
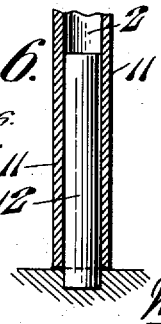
Figure 6, represents a vertical section on line 6—6, of Figure 5.
Figure 7:
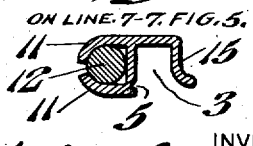
Figure 7, represents a horizontal section on line 7—7 of Figure 5.

In Fig. 5 I have shown an adaptation of my invention to hinged screens, in which case I provide a modified form of vertical frame member as shown in vertical and horizontal cross section in Figs. 6 and 7 respectively. In this modification the outer channel 2 is made with converging sides 11 as shown in Fig. 7, which provide support for the hinge pivots 12 and 13; and at the same time afford a better fitting joint between the jamb 14 and the vertical frame member adjacent to it. The pivot 13 is fixed within the channel, while the lower pivot 12 is slidably secured within the same, in any suitable manner, as a spring bolt or the like. By this pivotal hinging of the screen the same is readily attached to, the window jamb, by simply inserting the upper fixed pivot into a suitable receptacle contained within the head of the window frame while the lower pivot 12 is drawn back: and then inserting the lower pivot into a similar receptacle contained within the sill.

For the purpose of giving the screen cloth additional support against the lateral thrust exerted upon it, by the wind or other agencies, I may provide cross frame members 16, as illustrated in Figs. 1, 2, and 5.

It is thus clearly seen from the above description that the screen of my novel construction embodies a number of distinct advantages; among them, the extreme strength and resistance of the frame members, against any force tending to crush the same, as well as the perfect and intimate unison of the several frame members; resulting in a structure indestructible for all practical purposes, which is a decided improvement over the built-up sheet metal screen frame heretofore in use, which is subject to indentations and crushing due to external forces. My construction moreover being stronger and more rigid, will permit the use of narrower frame members, thus excluding less light and air when in position, and being of neater design and less conspicuous. The general appearance of the completed screen is further enhanced by the fact that no joints are visible.

The solid metal, open channel construction possesses the further advantages that some of the metal of the outer channel may be removed without materially impairing the rigidity of the frame. This is of particular utility when small adjustments in size of the finished frame are necessary to correct for errors in measurement, as well as in cases where parts of the frame must be cut away to clear obstructions on the sill, such as shutter fasteners.

Having thus described my invention what I claim as new and desire to secure by Letters Patent is:—

1. In a metallic screen, an integral, non-tubular metal frame having outer guide channels to receive guide strips and inner screen retaining channels to receive the edges of a screen fabric and a screen fabric retaining anchor member.

2. In a metallic screen, a frame formed from double channelled integral metal rails and stiles integrally united by mitred joints and a single integral web common to the channels of each rail and stile.

3. In metallic screens, a frame composed of double channelled integral frame members, one of said frame members having the sides of its outer channel convergent; screen cloth covering said frame; anchor members within the inner channels locking the overlapping edges of the screen cloth to the said inner or screen retaining channels; and hinge pivots inserted into the terminals of one of said frame members and secured therein by the converging sides of the outer channel thereof.

4. In a metallic screen, an integral, and non-tubular frame, having an inner screen retaining channel along the inner peripheral edge of one face thereof, screen cloth extending over said frame and having its edges extending into said channel, and a screen cloth retaining anchor member in said channel.

5. A metallic screen frame formed of double channelled integral metal rails and stiles, integrally united and a single integral web common to the two channels of each rail and stile; one of said channels of each rail and stile being in the face of the frame and the other of said channels being in the outer edges thereof.

6. In a metallic screen, a rigid frame composed of integral metal rails and stiles, a screen retaining channel in one face of said frame and co-extensive therewith, a screen cloth extending over said frame and having its edges extending into said channel and a screen cloth retaining anchor member in said channel.

7. In a metallic screen, a frame, a screen retaining channel in one face of said frame, a locking notch in one wall of said channel extending longitudinally thereof, and a tubular and substantially triangular screen cloth anchor member having one wall thereof convexed outwardly, said anchor member adapted to be inserted into said channel and to have one apex thereof forced into said notch by bending said convexed wall of the anchor member into a plane, thereby securely to lock said anchor member within said channel.

8. In a metallic screen, a frame, a screen retaining channel in one face of said frame, a tubular and substantially triangular screen cloth anchor member having a wall thereof convexed outwardly, said anchor member adapted to be inserted into said channel over the overhanging edges of a screen cloth with the convexed wall of said anchor member extending across the top of the channel, and means carried by one wall of said channel for engaging and interlocking with an apex of said triangular anchor member, said convexed wall of said anchor member being adapted to be bent back into a plane thereby to force said apex of said anchor member into interlocking engagement with said means, thereby securely to lock said anchor member within said channel.

ARTHUR L. OTTO.